Nov. 24, 1953     F. C. McCALLUM     2,660,091

HAEMACYTOMETER AND THE LIKE

Filed Sept. 22, 1948

INVENTOR.
FREDERICK C. McCALLUM
BY
ATTORNEYS

Patented Nov. 24, 1953

2,660,091

UNITED STATES PATENT OFFICE 2,660,091

HAEMACYTOMETER AND THE LIKE

Frederick C. McCallum, Williamsville, N. Y., assignor to American Optical Company, Southbridge, Mass., a voluntary association of Massachusetts Application September 22, 1948, Serial No. 50,508

9 Claims. (Cl. 88—40)

This invention relates to optical devices formed of light transmitting material and provided with reference marks of exceedingly minute size thereon, and more particularly to scales, reticules, microscope slides and the like formed of glass and upon which a semi-transparent layer of metallic material is carried. The invention also relates to a method of manufacture of such optical devices.

An example of one form of optical device employing such minute reference marks is a microscope slide of the type commonly termed a haemacytometer. It has been found advantageous to employ upon such haemacytometers, upon which blood samples are positioned for carrying out blood counts and other forms of specimen analysis, a semi-transparent metallic coating upon the optically flat upper surface thereof and in which division lines for defining a pattern are provided so that such counting and inspection of the blood may be more easily and accurately carried out. The metallic layer provides a grayish background while the limits of each counting area are clearly defined by bright division lines formed by the effective removal of the semi-transparent material. It will be appreciated, however, that while such counting areas are exceedingly small they must be nevertheless uniformly semi-transparent, substantially optically flat, of high abrasive and puncture resistance, exceedingly inert to substantially all types of chemicals and solvents commonly used therewith. On the other hand, the coating mush be of such qualities that same may be divided by ruling with a diamond point, or the like, and must provide smoothly edged lines and sharp corners even for the smallest of such areas.

It is an object of the invention to provide a new and improved method of manufacture of such optical devices and the invention also includes optical devices made by such an improved method.

A better understanding of the invention may be had by reference to the accompanying drawing in which.

Figure 1:
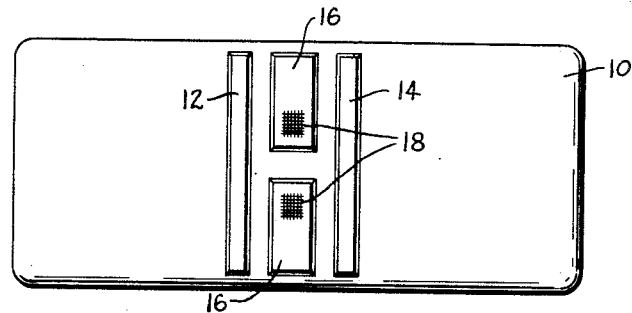
Fig. 1 is a plan view of a haemacytometer slide embodying he present invention.

Referring to the drawing in detail, Fig. 1 is an example of a haemacytometer slide 10 which may embody the invention, numerals 12 and 14 representing accurately ground and polished upstanding spaced ribs for supporting an optically flat ground and polished cover plate (not shown) a predetermined minute uniform distance above all portions of a pair of spaced plateaus or specimen receiving areas 16. These parts are arranged in such a manner that an H-shaped mote is formed between the four polished areas for accommodating excess material of the specimen upon a plateau for examination when a cover plate is placed upon the ribs and spreads the specimens into a thin uniform layer, thereby forcing the excess into said mote.

Figure 2:
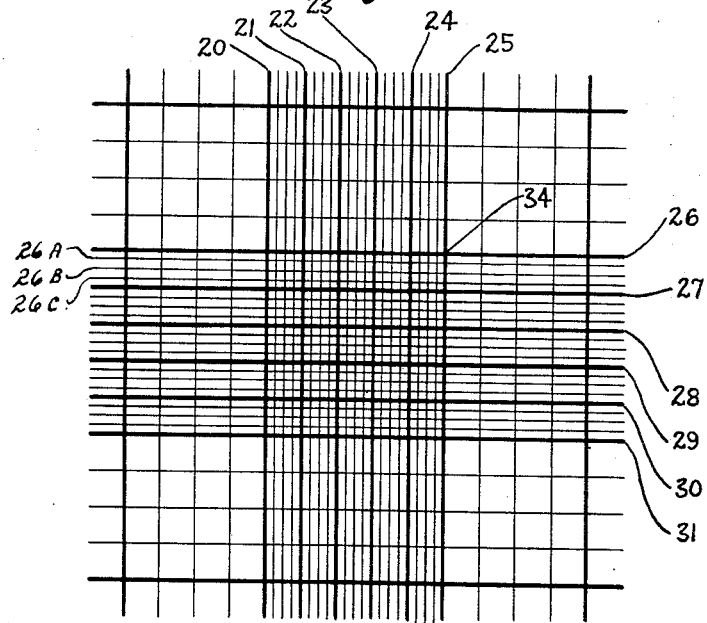
Fig. 2 is an enlarged diagrammatic showing of a ruling which may be used thereon.
Figure 3:
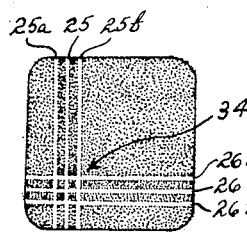
Fig. 3 is an enlargement of a minute portion of slide of Fig. 1.

Each plateau 16 is coated with a semi-transparent layer of metallic material by a sputtering or glow discharge process or an evaporation process carried out in a relatively high vacuum in known manner. While various metals may be used satisfactorily such as gold and silver and particularly metals of the platinum group, a much preferred material is rhodium because of its fine ability to resist wear, to adhere or bond well to the glass, rule well and resist chemical attack. Furthermore, it may be deposited as a relatively soft film which may be ruled readily, before being heat treated, without cutting appreciably into the glass, since cutting the glass would otherwise more rapidly dull the diamond point of the ruling machine. A small portion or area 18 of each coated plateau 16 is then ruled with a sharp diamond pointed tool to provide minute zones, squares or the like, preferably in the manner shown by Fig. 2 of the drawing. It has been found advantageous, particularly for blood count purposes, to divide parts of each area 18 into small squares by what would appear under a low-power microscope as heavy equally spaced lines 20 to 25 and 26 to 31, with the space between 20 and 25 and with the space between 26 and 31 each equal to one millimeter. Similarly between the adjacent heavy lines 20, 21, 22, etc., three equally spaced light lines such as 24A, 24B, 24C and 26A, 26B, 26C appear. This effectively divides the center of the pattern into twenty-five heavy squares of two tenths of a millimeter on a side and each of these into sixteen small squares of five hundredths of a millimeter on a side. However, as will be more clearly appreciated from inspection of Fig. 3 of the drawing, an enlargement of the intersection 34 of lines 25 and 26 in Fig. 2, these heavy lines or boundary lines are each in effect formed by three closely spaced fine lines such as 25, 25a and 25b arranged approximately 2½ microns from each other and three similar closely spaced fine lines 26, 26a and 26b running at right angles thereto.

Obviously, all of these fine lines should be as smooth and even as possible and where such triple lines cross each other at right angles, the small squares formed thereby, which are of exceedingly minute size, should be as clear and as smoothly formed as possible. After the ruling process had been completed, it was found advantageous to heat treat the metallic coating to increase its wear and abrasion resistance. Of necessity such devices are subjected to the closest of scrutiny and required to meet the highest of optical standards in order to be acceptable. Since a comparatively high number of such devices made by earlier methods were rejected during manufacture, because this high standard was not reached, applicant endeavored to improve such optical devices and their method of manufacture.

It has been found that improved optical devices of the character described can be made when borosilicate types of glass having especially high silica contents are employed and when same are properly coated, ruled and heat treated. While a semi-transparent layer of rhodium gives excellent results, other material such as gold, platinum and silver may be used and substantially as good results are obtained. The ruling can be effected readily in the coating when coated upon this high silica glass and when the devices are properly heated for the proper period and in the proper heating range, an exceedingly strong and durable bond between such thin metallic layer and the glass is effected. Substantially all of the difficulties encountered in the formation of earlier devices is removed. Borosilicate glasses of the type referred to above may cover a considerable range when considered from a chemical analysis standpoint, such as indicated by the following tables of glasses A, B, C and D which give satisfactory results:

|  | A | B | C | D |
|---|---|---|---|---|
| $SiO_2$ | 70 | 80.9 | 80.1 | 90 |
| $B_2O_3$ | 20 | 12.9 | 13.1 | 6 |
| $Na_2O$ | 4 | 4.4 | 2.0 | 3 |
| $Al_2O_3$ | 6 | 1.8 | 2.4 | 1 |
| $K_2O$ |  |  | 2.7 |  |
| $Li_2O$ |  |  | .7 |  |

The ground and polished glass to be coated is first placed in a vacuum chamber and coated with one of the metals mentioned above by a sputtering process until a proper thickness of metal is obtained, for example upon plateaus 16 of the slide 10. The slide is then removed and ruled with a diamond pointed tool with pattern desired. After the ruling step in the manufacture of haemacytometers, and the like, has been carried out, a heat treatment of the coated slide within a proper temperature range is performed for a considerable time period, approaching 3 to 5 hours for effecting a hardening of the coating, with the length of heat treatment being dependent upon the temperature, lower temperatures requiring the longer time periods. For the C type glass the best temperature would be between approximately 590° and 605° centigrade, but might be performed at as low as approximately 450° C.

While it is known that exceedingly advantageous results are now obtained by the carrying out of the processes of the present invention, it is not known for certain just why such results occur. It is believed, however, that possibly the reason for the satisfactory results of the coated material upon the borosilicate glasses of high silica content may be because glasses of this type may be considered to be in effect glasses of a two-component or two-phase type. In the Journal of Research of the National Bureau of Standards, volume 40, page 67, there appears an article by A. Q. Tool and J. B. Saunders in which such glass is discussed. In fact a portion of this article states that glasses of this type have two component parts, one of which remains as a practically rigid and continuous framework extending throughout the body of the glass when the glass is heated to temperatures between approximately 500 to 600° C. while the other component interlaced therewith is so deformable in this range that its physical state is definitely that of a liquid glass. In fact it starts to become deformable at temperatures as low as 450° C. It may be that at such times a fusing or integral bonding condition is effected between this deformable or substantially liquid component of the glass and the metallic coating material which creates a strong and uniform bond throughout all parts of the coated area. The temperature at which the hardening process is carried out is so selected that it lies above the softening point of one component but below the softening point of the other component of this borosilicate type glass.

Such improved results have been effected by the use of a high silica borosilicate type of glasses that experiments have been carried on in attempts to ascertain what might be the reason for same. One experiment of particular interest and showing a definite improvement in the new coating process has been shown by placing two thin small one inch squares of glass, one of the earlier type employed, known commercially as spectacle crown, and one of the type employed by the present invention in a vacuum chamber, protecting one half of each with a shield, and then coating the clear halves with metal by the sputtering operation. Thus there was effected upon one half of the optically flat surface of each square a semi-transparent coating of metal (rhodium). Upon inspection of these squares, when removed from the coating chamber and after having been properly heat treated, it could be readily observed without the aid of any optical instruments that the coated area of the spectacle crown was warped noticeably out of shape, these squares were only 20 thousandths of an inch thick and this warpage was as much as 15 thousandths of an inch. On the other hand, the uncoated portion of the same square was in no way distorted. The high silica borosilicate glass square, however, had both its coated and uncoated portions still in an optically flat condition. Obviously this rhodium layer upon the earlier type glass in some way strained or warped or tended to strain or warp the glass and that such a condition might be one reason why poor bonding, discoloration or the like at times occurred in the earlier constructions.

It is interesting to note that one reason for the use of spectacle crown glass heretofore with rhodium as a proper combination for haemacytometer slides was arrived at on the theory that both had together with other valuable properties nearly the same coefficients of expansion (spectacle crown being approximately $9 \times 10^{-6}$ and rhodium being approximately $8 \times 10^{-6}$). In borosilicate glass of high silicate types, a much different coefficient of expansion (in the neighborhood of 3.2 to 4.5) are commonly encountered, but notwithstanding this different coefficient of expansion, as compared to rhodium for example, improved results are obtained, indicating possibly that in combination with a two-component type of glass the difference of coexpansions played a less important part than heretofore believed.

Whether the reason for the improved results are, as stated above, due to two components or two phases existing in this type of borosilicate glass or due to some other reasons not now known to the inventor, it is nevertheless clear that light transmitting optical devices having semi-transparent coatings ruled as closely as 2.5 microns can be made by the teachings of the present invention to effect more durable lasting working surfaces upon optical devices of the character described.

Having described the invention, I claim:

1. A light transmitting optical device comprising a transparent supporting member formed of a relatively high silica borosilicate two-phase type of glass having a silica content of between approximately 70% and 90%, a boric oxide content between approximately 20% and 6%, a sodium oxide content between approximately 4.5% and 2%, and an aluminum oxide content between approximately 6% and 1%, said glass having two predominantly different heat responsive softening temperatures, said member having a smooth surface thereon, and a semi-transparent layer thereon formed of a metallic material of substantially uniform density and selected from the group consisting of gold, silver and the platinum metals, and having a plurality of fine sharply defined closely spaced substantially parallel ruled reference lines therein, one of said reference lines being spaced from an adjacent reference line by an amount approximately equal to five hundredths of a millimeter, said layer being relatively hard and abrasive resistant and tenaciously bonded to said smooth surface, and having the characteristics of a vacuum deposited coating, and with the bond between said layer and said member having characteristics like those resulting from the heating of said member and said layer thereon at a temperature between the lower of said softening temperatures and upper of said softening temperatures for a time sufficient to soften one of the phases of said glass.

2. The method of forming a light transmitting optical element having a closely ruled semi-transparent surface coating thereon, comprising coating in a partial vacuum and surface of an element of glass of the two-phase borosilicate type having two predominantly different heat responsive softening temperatures, with a semi-transparent layer of a metallic material of substantially uniform density and selected from the group consisting of gold, silver and the platinum metals, removing said glass element from said vacuum and ruling a plurality of substantially parallel fine sharply defined closely spaced reference lines in said layer with one of said reference lines being spaced from an adjacent reference line by an amount approximately equal to five hundredths of a millimeter, and heating said coated ruled element for a period from approximately 3 to 5 hours at a temperature above the lower softening temperature of said glass and below the upper softening temperature thereof to harden the ruled layer and produce a tenacious bond between said layer and said element.

3. The method of forming a light transmitting optical element having a closely ruled semi-transparent surface thereon, comprising coating in a partial vacuum a surface of a relatively high silica borosilicate two-phase type glass having a silica content between approximately 70% and 90%, a boric oxide content between approximately 20% and 6%, a sodium oxide content between approximately 4.5% and 2% and an aluminum oxide content of approximately 6% and 1%, said glass having two predominantly different heat responsive softening temperatures, with a semi-transparent layer of a metallic material of substantially uniform density and selected from the group consisting of gold, silver and the platinum metals, removing said coated glass element from said vacuum and ruling a plurality of substantially parallel fine sharply defined closely spaced reference lines in said layer, with one of said reference lines being spaced from an adjacent reference line by an amount approximately equal to five hundredths of a millimeter, and heating said coated and ruled element for a period of time between approximately 3 and 5 hours at a temperature above the lower softening temperature of one phase of said glass and below the upper softening temperature of the other phase thereof to harden said ruled layer and produce a tenacious bond between said layer and said glass element.

4. The method of forming a light transmitting element having a closely ruled semi-transparent surface thereon comprising coating in a partial vacuum a smooth surface of a relatively high silica borosilicate two-phase type glass element with a semi-transparent layer of metallic material of substantially uniform density and selected from the group consisting of gold, silver and the platinum metals, removing said glass element from said vacuum and ruling a plurality of substantially parallel fine sharply defined closely spaced reference lines in said layer by the effective removal of coating material therefrom, with one of said reference lines being spaced from an adjacent reference line by an amount approximately equal to five hundredths of a millimeter, and heating said coated ruled glass element for a period from approximately 3 to 5 hours at a temperature ranging from 450° to 605° centigrade so as to produce a tenacious bond between said layer and said glass element.

5. The method of forming a light transmitting optical element having a closely ruled semi-transparent surface thereon, comprising coating in a partial vacuum a surface of a relatively high silica borosilicate two-phase type glass element having a silica content of between approximately 70% and 90%, a boric oxide content between approximately 20% and 6%, a sodium oxide content between approximately 4.5% and 2%, and aluminum oxide content between approximately 6% and 1%, with a semi-transparent layer of metallic material of substantially uniform density and selected from the group consisting of gold, silver and the platinum metals, removing said glass element from said vacuum and ruling a plurality of substantially parallel fine sharply defined closely spaced reference lines in said layer with one of said reference lines being spaced from an adjacent reference line by an amount approximately equal to five hundredths of a millimeter, and heating said coated ruled glass element for a period from approximately 3 to 5 hours at a temperature ranging between approximately 450° and 605° centigrade so as to harden said ruled layer and produce a tenacious bond between said layer and said glass element.

6. The method of making a haemacytometer comprising forming upon a piece of light transmitting borosilicate glass of the two-phase type having a relatively high silica content ranging between approximately 70% and 90%, a boric oxide content ranging between approximately 20% and 6%, a sodium oxide content ranging between approximately 4.5% and 2%, and an aluminum oxide content ranging between approximately 6% and 1%, a smooth flat surface and a pair of ribs at opposite sides of said surface having flat cover supporting portions thereon disposed in a plane substantially parallel to said flat surface, and located substantially at a predetermined distance from said flat surface, coating in a partial vacuum said flat surface with a semi-transparent layer of a metallic material of uniform density and selected from the group consisting of gold, silver and the platinum metals, removing said glass from said vacuum and ruling a plurality of substantially parallel fine sharply defined closely spaced reference lines in said coated surface with one of said reference lines being spaced from an adjacent reference line by an amount approximately equal to five hundredths of a millimeter, and heating said coated ruled glass for a period of approximately 3 to 5 hours at a temperature ranging from approximately 450° to 605° centigrade so as to harden said layer and produce a tenacious bond between said layer and said glass.

7. A light-transmitting optical device comprising a transparent supporting member formed of a relatively high silica borosilicate glass having a silica content of between approximately 70% and 90%, a boric oxide content between approximately 20% and 6%, a sodium oxide content between approximately 4.5% and 2%, and an aluminum oxide content between approximately 6% and 1%, said transparent supporting member having a smooth surface thereon and a semi-transparent layer on said surface formed of a metallic material of substantially uniform density and selected from the group consisting of gold, silver and the platinum metals, and having a plurality of fine sharply defined closely spaced substantially parallel ruled reference lines therein, one of said reference lines being spaced from an adjacent reference line by an amount approximately equal to five hundredths of a millimeter, said layer being relatively hard and abrasive resistant and tenaciously bonded to said smooth surface, and having the characteristics of a vacuum deposited coating, and with the bond between said layer and said transparent supporting member having characteristics like those resulting from the heating of said member and said layer thereon at a temperature ranging from 450° to 605° centigrade for a period from approximately 3 to 5 hours.

8. A light-transmitting optical device comprising a transparent supporting member formed of a relatively high silica borosilicate glass having a silica content of between approximately 70% and 90%, a boric oxide content between approximately 20% and 6%, a sodium oxide content between approximately 4.5% and 2%, and an aluminum oxide content between approximately 6% and 1%, said transparent supporting member having a smooth surface thereon and a semi-transparent layer on said surface formed of a metallic material of substantially uniform density and selected from the group consisting of gold, silver and the platinum metals, and having a plurality of fine sharply defined closely spaced substantially parallel ruled reference lines therein, one of said reference lines being spaced from an adjacent reference line by an exact predetermined amount ranging between approximately 5 hundredths and 2.5 thousandths of a millimeter, said layer being relatively hard and abrasive resistant and tenaciously bonded to said smooth surface, and having the characteristics of a vacuum deposited coating, and with the bond between said layer and said transparent supporting member having characteristics like those resulting from the heating of said member and said layer thereon at a temperature ranging from 450° to 605° centigrade for a period from approximately 3 to 5 hours.

9. The method of forming a light-transmitting optical element having a closely ruled semi-transparent surface coating thereon, said method comprising coating in a partial vacuum a smooth surface portion of a relatively high silica borosilicate glass element with a semi-transparent layer of a metallic material of substantially uniform density and selected from the group consisting of gold, silver and the platinum metals, said glass element having a silica content between approximately 70% and 90%, a boric oxide content between approximately 20% and 6%, a sodium oxide content between approximately 4.5% and 2% and an aluminum oxide content between approximately 6% and 1%, removing the coated glass element from said vacuum and ruling a plurality of substantially parallel fine, sharply defined spaced reference lines in said layer, with one of said reference lines being spaced from an adjacent reference line by an exact predetermined amount ranging between approximately 5 hundredths and 2.5 thousandths of a millimeter, and heating said coated ruled element for a period of time between approximately 3 and 5 hours at a temperature between approximately 450° and 605° centigrade, whereby a tenacious bond between said layer and said glass element will be produced and the said exact predetermined spacing provided said one reference line and said adjacent reference line will be substantially maintained.

FREDERICK C. McCALLUM.

References Cited in the file of this patent

UNITED STATES PATENTS

| Number | Name | Date |
|---|---|---|
| 1,693,961 | Risch | Dec. 4, 1928 |
| 1,744,642 | Kondo | Jan. 21, 1930 |
| 1,824,097 | Ott | Sept. 22, 1931 |
| 1,994,483 | Ott | Mar. 19, 1935 |
| 2,239,452 | Williams et al. | Apr. 22, 1941 |
| 2,286,275 | Hood et al. | June 16, 1942 |
| 2,428,600 | Williams | Oct. 7, 1947 |